US011483830B2

(12) United States Patent
Sun et al.

(10) Patent No.: US 11,483,830 B2
(45) Date of Patent: *Oct. 25, 2022

(54) FREQUENCY SPECTRAL MANAGEMENT APPARATUS AND METHOD, GEOGRAPHICAL LOCATION DATABASE AND SECONDARY SYSTEM APPARATUS

(71) Applicant: Sony Corporation, Tokyo (JP)

(72) Inventors: Chen Sun, Beijing (CN); Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 76 days.

This patent is subject to a terminal disclaimer.

(21) Appl. No.: 17/066,516

(22) Filed: Oct. 9, 2020

(65) Prior Publication Data

US 2021/0029699 A1    Jan. 28, 2021

Related U.S. Application Data

(63) Continuation of application No. 16/703,899, filed on Dec. 5, 2019, now Pat. No. 10,827,495, which is a
(Continued)

(30) Foreign Application Priority Data

Jul. 30, 2013    (CN) .......................... 201310325426.X

(51) Int. Cl.
*H04W 72/04* (2009.01)
*H04W 16/14* (2009.01)
(Continued)

(52) U.S. Cl.
CPC ....... *H04W 72/0453* (2013.01); *H04W 16/14* (2013.01); *H04W 72/082* (2013.01); *H04W 72/10* (2013.01)

(58) Field of Classification Search
CPC combination set(s) only.
See application file for complete search history.

(56) References Cited

U.S. PATENT DOCUMENTS

| 2009/0252134 | A1* | 10/2009 | Schlicht | ................ | H04L 1/0015 |
| | | | | | 709/205 |
| 2011/0080882 | A1* | 4/2011 | Shu | ........................ | H04W 28/26 |
| | | | | | 370/329 |

(Continued)

FOREIGN PATENT DOCUMENTS

| CN | 101064905 A | 10/2007 |
| CN | 101296139 A | 10/2008 |

(Continued)

OTHER PUBLICATIONS

Chinese Office Action dated Aug. 3, 2018 in Chinese Application No. 201310325426.X.

(Continued)

*Primary Examiner* — Ajay Cattungal
(74) *Attorney, Agent, or Firm* — Xsensus LLP

(57) ABSTRACT

A system that receives a request for resources from a first system of a plurality of systems having different levels of priority; identifies resources that are available in a second system different from the plurality of systems based on the received request; and determines whether to adjust a resource assigned to the plurality of systems based on the priority level of the first system and the resources that are available in the second system.

20 Claims, 8 Drawing Sheets

Related U.S. Application Data continuation of application No. 16/110,195, filed on Aug. 23, 2018, now Pat. No. 10,531,462, which is a continuation of application No. 14/895,167, filed as application No. PCT/CN2014/083212 on Jul. 29, 2014, now Pat. No. 10,085,259.

(51) Int. Cl.
*H04W 72/08* (2009.01)
*H04W 72/10* (2009.01)

(56) References Cited

U.S. PATENT DOCUMENTS

| | | | |
|---|---|---|---|
| 2011/0286401 A1 | 11/2011 | Wijting et al. | |
| 2012/0014332 A1 | 1/2012 | Smith | |
| 2012/0108179 A1* | 5/2012 | Kasslin | H04W 16/14 455/67.13 |
| 2012/0147857 A1* | 6/2012 | Wu | H04W 74/002 370/336 |
| 2013/0021932 A1* | 1/2013 | Damnjanovic | H04W 52/0209 370/252 |
| 2013/0023295 A1* | 1/2013 | Kasslin | H04W 48/14 455/501 |
| 2013/0028128 A1* | 1/2013 | Novak | H04B 17/382 370/252 |
| 2013/0039325 A1 | 2/2013 | Guo | |
| 2013/0051358 A1* | 2/2013 | Turtinen | H04W 72/1284 370/330 |
| 2013/0077554 A1* | 3/2013 | Gauvreau | H04W 72/0453 370/312 |
| 2013/0183995 A1 | 7/2013 | Smith | |
| 2014/0038657 A1* | 2/2014 | Jo | H04W 72/005 455/509 |
| 2014/0162715 A1* | 6/2014 | Pak | H04W 16/14 455/512 |

FOREIGN PATENT DOCUMENTS

| | | |
|---|---|---|
| CN | 101568125 A | 10/2009 |
| CN | 102595420 A | 7/2012 |
| EP | 2941912 A1 | 11/2015 |
| EP | 3697121 A1 | 8/2020 |

OTHER PUBLICATIONS

International Search Report and Written Opinion dated Nov. 4, 2014 in PCT/CN2014/083212 filed on Jul. 29, 2014.

* cited by examiner

FREQUENCY SPECTRAL MANAGEMENT APPARATUS AND METHOD, GEOGRAPHICAL LOCATION DATABASE AND SECONDARY SYSTEM APPARATUS

CROSS-REFERENCE TO RELATED APPLICATIONS

This application is a continuation of U.S. application Ser. No. 16/703,899, filed Dec. 5, 2019, which is a Continuation of U.S. application Ser. No. 16/110,195, filed Aug. 23, 2018 (now U.S. Pat. No. 10,531,462), which is a Continuation of U.S. application Ser. No. 14/895,167, filed Dec. 1, 2015 (now U.S. Pat. No. 10,085,259), which is a national stage (under 35 U.S.C. 371) of International Patent Application No. PCT/CN2014/083212, filed Jul. 29, 2014, claiming priority to Chinese Patent Application No. 201310325426.X, filed Jul. 30, 2013, the entire disclosure of each of which are incorporated herein by reference.

FIELD OF THE INVENTION

The present invention generally relates to the field of wireless communication, and particularly relates to frequency spectral management in a radio system. More particularly, the present invention relates to a frequency spectral management apparatus, a geographical location database, a secondary system apparatus and a frequency spectral management system including these apparatus as well as a frequency spectral management method, for achieving reasonable usage of frequency spectral resources in a cognitive radio system.

BACKGROUND OF THE INVENTION

With the evolution of the wireless communication system, the users have higher and higher demand for services with high quality, high speed and new services. The wireless communication operators and equipment manufacturers are required to continuously improve systems to meet the users' demand. It requires a large amount of frequency spectral resources (The frequency spectral resources can be evaluated numerically for example with parameters such as time, frequency, bandwidth, allowable maximum emission power.) to support new services and satisfy the demand for high speed communication. However, the frequency spectral resources are limited, and are already distributed to fixed operators or services. New available frequency spectral resources are either rare or quite expensive.

In this context, the concept of dynamic frequency spectral usage is proposed, where those frequency spectral resources already authorized (distributed) to some services but not sufficiently made use of are dynamically utilized. The current cognitive radio system is based on this idea. The cognitive radio system can automatically detect the surrounding wireless environments, and allow other users or systems (secondary users or secondary systems) to make use of frequency spectral resources for an authorized user or system (primary user or system) in the case that no harmful interferences will be caused to the authorized user or system. With the development of the cognitive radio system, various secondary systems will access to request the usage of the frequency spectral resources for the primary system in the future, and it is necessary to solve the problem of coordinating the frequency spectral resources allocation among various types of secondary systems efficiently in the case that competition occurs among a plurality of secondary systems.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

In view of the above demand, the present invention aims to provide a frequency spectral management apparatus and a frequency spectral management method, which divides priority levels for the secondary systems coexisting with the primary system that competes with each other in the cognitive radio system and manage the frequency spectral usage of secondary systems with different priority levels. The present application also provides a geographical location database with a relatively simplified function which cooperates with the frequency spectral management apparatus, corresponding secondary system apparatus in the secondary systems, and a frequency spectral management system including the frequency spectral management apparatus, the geographical location database and the secondary system apparatus.

According to an aspect of the present invention, a system is provided that receives a request for resources from a first system of a plurality of systems having different levels of priority; identifies resources that are available in a second system different from the plurality of systems based on the received request; and determines whether to adjust a resource assigned to the plurality of systems based on the priority level of the first system and the resources that are available in the second system.

The system realizes efficient usage of the frequency spectral resources by dividing the secondary systems into different priority levels, processing the frequency spectral usage requests of secondary systems with different priority levels, and adjusting the frequency spectral used by the secondary systems with a low priority level.

These and other advantages of the present invention will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings.

DETAILED DESCRIPTION OF THE INVENTION

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

Cognitive Radio System

First, the cognitive radio system where the frequency spectral management apparatus is located is simply described. Generally, the cognitive radio system includes a primary system and secondary systems. The primary system is a system with right to use the frequency spectral, which can includes multiple users (primary users). The secondary system can be a system without right to use the frequency spectral which can perform communication using the frequency spectral appropriately only when the primary system does not use the frequency spectral. The secondary system can have multiple users (secondary users). Alternatively, the secondary system can also be a system with right to use the frequency spectral but have a lower priority level than the primary system in the using of the frequency spectral. For example, when the operators deploy new base stations to provide new services, the existing base station and the provided services are taken as the primary system, having priority in using the frequency spectral.

To be noted, the available frequency spectral resources here can be referred as time, frequency band, transmission power, etc.

Figure 1:
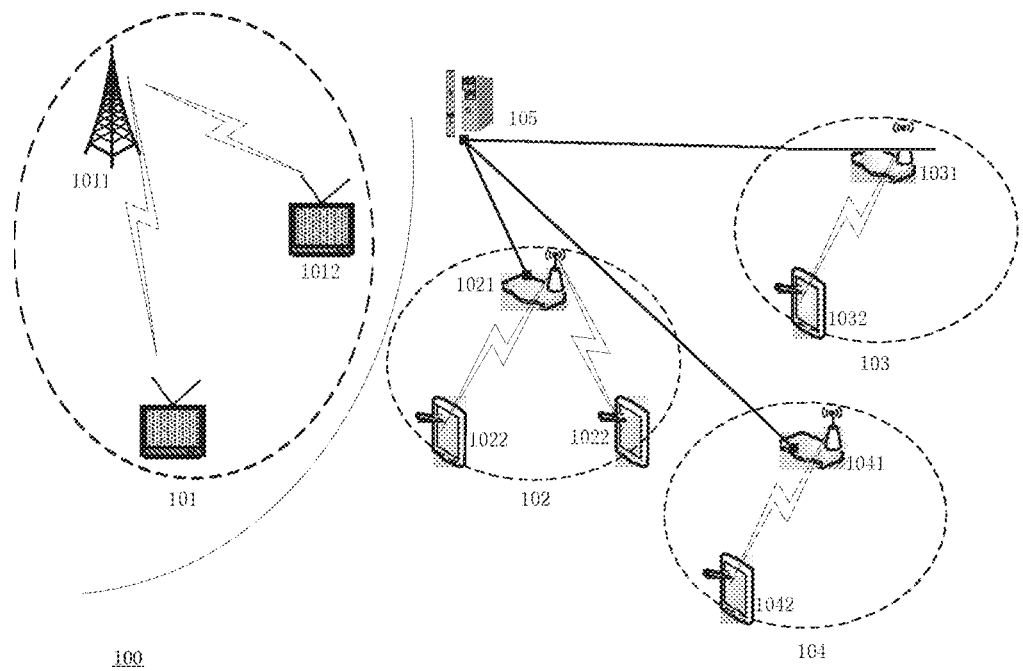
FIG. 1 is a schematic drawing illustrating the constitution of a cognitive radio system according to an embodiment of the invention.

FIG. 1 shows a schematic drawing illustrating the constitution of a cognitive radio system 100 according to an embodiment of the invention, as an application instance. In the cognitive radio system 100, since the TV broadcast frequency spectral itself is allocated to the TV broadcast system, therefore, the TV broadcast system is the primary system 101, including a primary user base station 1011 and multiple primary users (televisions) 1012. The mobile communication system 102, 103 and 104 are secondary systems, including secondary user base stations 1021, 1031, 1041 and secondary users 1022, 1032, 1042 respectively. In the cognitive radio system 100, the frequency spectral of a channel where no program is broadcast or the frequency spectral of an adjacent channel in the digital TV broadcast frequency spectral can be dynamically used and wireless mobile communication can be performed, in the case of not interfering the receiving of the TV signals.

Specifically, UHF frequency band is allocated to the TV broadcast service, and thus the TV broadcast system has the highest priority level in this frequency band and is the primary system. In addition, the frequency spectral resources in the UHF which are not used in a time period and in an area by the TV broadcast system can be allocated to other communication system for use.

Such a communication manner of primary system and secondary systems coexisting requires that the applications of the secondary systems do not produce negative affect on the applications of the primary system. In other words, the affect incurred by the frequency spectral usage of the secondary systems can be controlled within the primary system allowable range. In the situation that the interference to the primary system is maintained within certain range, that is, does not exceed the primary system's threshold, a plurality of secondary systems can share the frequency spectral resources for the primary system which can be used by these system.

Those skilled in the art can understand that, although FIG. 1 shows the case of the primary system being the TV broadcast system, the present application is not limited to this, and the primary system can also be a mobile communication system with the right of frequency spectral usage, while the secondary systems can also be other systems requiring to use the frequency spectral resources to perform communication, such as the smart meter reading system. In addition, the number of mobile communication system is not limited to 3, but can be more or less.

Currently, one of the main manners for protecting the primary system is to store the coverage information of the primary system into a database, which further stores the interference threshold the primary system can allow. The secondary system in the same as area as that the primary system is located first has to access this database and submit the state information of the secondary system such as position information, spectrum emission mask, transmission bandwidth and carrier frequency, before beginning to make use of the frequency spectral for the primary system. Then, the database calculates the amount of interference to be produced by the secondary system to the primary system according to the state information of the secondary system, and compute the pre-estimated available frequency spectral resources for the secondary system under the current state according to the calculated amount of interference the secondary system produced to the primary system under the current state.

Frequency Spectral Management Apparatus

In FIG. 1, the cognitive radio system 100 can adopt the frequency spectral management apparatus 105 to manage the allocation of frequency spectral resources among different secondary systems.

Figure 2:
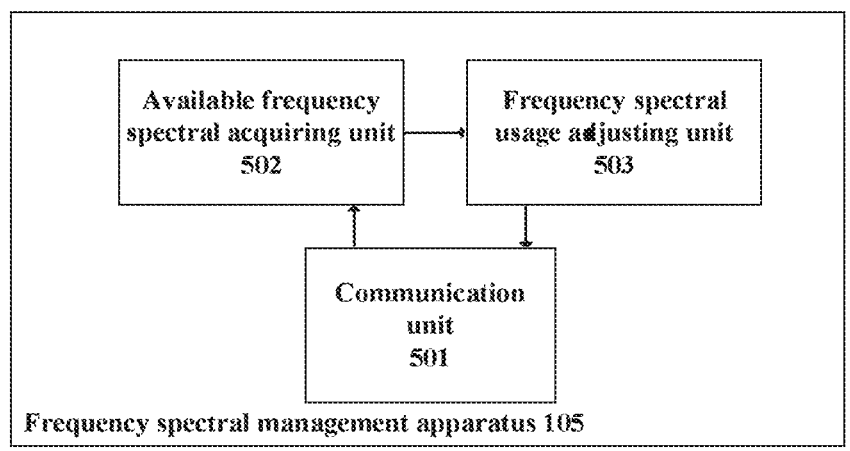
FIG. 2 shows the structural block diagram of the frequency spectral management apparatus in the cognitive radio system according to an embodiment of the invention.

According to an embodiment of the application, the cognitive radio system 100 comprises a primary system 101, a first level secondary system (for example, the secondary system 102), and a second level secondary system (for example, the secondary system 103, 104), the first level secondary system making use of frequency spectral resources for the primary system with a higher priority level than the second level secondary system. As shown in FIG. 2, the frequency spectral management apparatus 105 in the cognitive radio system 100 includes: a communication unit 501, configured to receive information of a target secondary system requesting usage of the frequency spectral resources for the primary system; an available frequency spectral acquiring unit 502, configured to acquire pre-estimated available frequency spectral for the target secondary system; and a frequency spectral usage adjusting unit 503, configured to determine adjustment with respect to the pre-estimated available frequency spectral for the target secondary system so as to determine available frequency spectral for the target secondary system, and/or determine adjustment with respect to the frequency spectral used by existing second level secondary systems, according to the priority level of the target secondary system.

In addition, the frequency spectral usage adjusting unit 503 can further provide the adjusting information to the communication unit 501, so as to provide the same directly or via the geographical location database to be mentioned latter to corresponding secondary systems. For example, the frequency spectral usage adjusting unit 503 can be configured to adjust the frequency spectral usage of the corresponding existing second level secondary systems according to the determined adjustment with respect to the frequency spectral used by the existing second level secondary systems.

In the cognitive radio system 100, the secondary systems are classified into the first level secondary systems and the second level secondary systems according to their priority levels in the terms of the frequency spectral usage. The priority level of the first level secondary systems is higher than that of the second level secondary systems. By controlling their usage of the frequency spectral resources for the primary system according to the priority levels of the secondary systems, the communication quality of the secondary systems with a high priority level can be ensured as much as possible, and the available frequency spectral resources to the secondary systems with a low priority level can be maximized in the case that the secondary systems with a high priority level do not use the frequency spectral.

The priority levels of the secondary systems can be preset in advance, or vary according to the variation of the application types of the systems. For example, a mobile communication system with QoS guarantee (for example, using the frequency spectral resources for the primary system by paying) provided by the operators is a first level secondary system, and a system without QoS guarantee which uses the frequency spectral randomly (for example, using the frequency spectral resources for the primary system for free) is a second level secondary system. However, the setting of the priority level of a secondary system is not limited thereto, and can be set according to the practical application.

When a target secondary system (for example, can be any one of the secondary systems 102, 103 and 104) files a request for using the frequency spectral resources for the primary system 101 to the frequency spectral management apparatus 105 directly, the communication unit 501 in the frequency spectral management apparatus 105 receives this request information, and provides it to the available frequency spectral acquiring unit 502. The request information includes related information regarding the target secondary system. Further, as will be discussed in the embodiments hereinafter, this request is not necessary to be received from the target secondary system directly, but can also come from the geographical location database in the cognitive radio system.

As an example, the request information can include priority information of the secondary system explicitly. Alternatively, the request information can include only identification (ID) of the secondary system, and the frequency spectral management apparatus 105 query a stored list of system IDs and corresponding priority levels according to this ID to determine the priority level of the secondary system. It should be understood that the kinds of information which can be contained in the request information are not limited thereto.

For example, the request information can include the geographical location of the target secondary system. In addition, the request information can further include system parameters of the target secondary system, the quality requirement of the frequency spectral usage of the target secondary system and the interference threshold for the target secondary system, etc.

The available frequency spectral acquiring unit 502 acquires the pre-estimated available frequency spectral for the target secondary system in response to the received request information, to preliminarily confirm the frequency spectral which may be used by the target secondary system according to the interference the primary system 101 is subjected to.

In an embodiment, the available frequency spectral acquiring unit 502 is configured to acquire the pre-estimated available frequency spectral under a condition that interference the primary system is subjected to is expected not to exceed an interference threshold for the primary system when the target secondary system makes use of the frequency spectral resources for the primary system.

Specifically, the available frequency spectral acquiring unit 502 can acquire the pre-estimated available frequency spectral by calculating on the basis of the request information, or acquire information about the pre-estimated available frequency spectral from an outside database directly. The calculating of the pre-estimated available frequency spectral can be achieved by virtue of any prior art.

Then, the frequency spectral usage adjusting unit 503 determines adjustment with respect to the pre-estimated available frequency spectral for the target secondary system, and further determines adjustment with respect to the frequency spectral used by existing second level secondary systems as necessary, according to the priority level of the target secondary system acquired based on the request information. Subsequently, the adjusting information is provided to the communication unit 501, which feeds the adjusting information back to corresponding secondary systems or the outer apparatus such as the geographical location database which sends the request information.

By using the frequency spectral usage adjusting unit 503, it can be ensured that the allocation of the frequency spectral resources to the target secondary system does not affect the frequency spectral usage of the existing primary system and secondary systems with a high priority level. Moreover, the efficiency of the frequency spectral usage can be maximized by allocating the frequency spectral resources according to the priority levels of the secondary systems.

Figure 3:
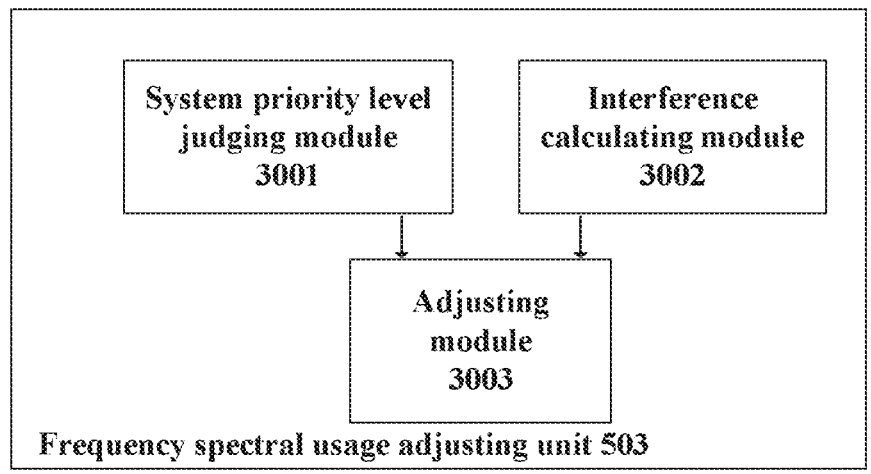
FIG. 3 shows the structural block diagram of the frequency spectral usage adjusting unit in the frequency spectral management apparatus according to an embodiment of the invention.

FIG. 3 shows the structural block diagram of the frequency spectral usage adjusting unit 503 according to an embodiment of the invention. As shown in FIG. 3, the frequency spectral usage adjusting unit 503 includes: a system priority level judging module 3001, configured to judge the priority level of the target secondary system; an interference calculating module 3002, configured to calculate pre-estimated interferences existing first level secondary systems are subjected to when the target secondary system makes use of the frequency spectral resources for the primary system in accordance with the pre-estimated available frequency spectral therefor; and an adjusting module 3003, configured to determine adjustment with respect to the pre-estimated available frequency spectral for the target secondary system so as to determine the available frequency spectral therefor.

Wherein, the system priority level judging module 3001 can judge the priority level of the target secondary system according to the request information therefrom, and the specific manner depends on the type of the request information, as discussed above.

In order to keep the effect to the communication of the existing first level secondary systems within a certain range, the interference calculating module 3002 estimates the pre-estimated interferences the existing first level secondary systems are subjected to when the target secondary system performs communication making use of the pre-estimated available frequency spectral therefor acquired by the available frequency spectral acquiring unit 502. Then, the adjusting module 3003 determines adjustment with respect to the pre-estimated available frequency spectral for the target secondary system according to the result of the estimating, so as to determine the frequency spectral which can be actually used by the target secondary system.

In one embodiment, the adjusting module 3003 determines frequency spectral less than the pre-estimated available frequency spectral as the available frequency spectral for the target secondary system, in the case that the pre-estimated interferences calculated by the interference calculating module 3002 exceed interference thresholds for the existing first level secondary systems. In other words, when the result of estimating indicates that if the target secondary system performs communication using the pre-estimated available frequency spectral, intolerable affect will be caused to the quality of communication of the existing first level secondary systems, the adjusting module 3003 reduces this pre-estimated available frequency spectral, for example, by a fixed amount or by an amount of frequency spectral corresponding to the amount of interferences exceeding the each of the interference thresholds for the existing first level secondary systems.

However, the following case might occur: when the target secondary system is a first level secondary system with QoS (Quality of Service) requirement, the reduction of the pre-estimated available frequency spectral for the target secondary system will lead to a result that the quality of communication of the target secondary system cannot be guaranteed.

To solve this problem, if the system priority level judging module 3001 judges that the target secondary system is a first level secondary system, the adjusting module is further configured to determine adjustment with respect to the frequency spectral used by the existing second level secondary systems on the basis of the requesting information of the target secondary system.

The following situation also may exist: if the target secondary system is a first level secondary system, and the interferences caused by the respective existing secondary system to the target secondary system exceed a pre-determined range so that the target secondary system cannot reach the expected communication quality, the adjusting module 3003 can reduce the frequency spectral used by the existing second level secondary systems. As such, on the one hand, the amount of interferences caused by the existing second level secondary systems to the target secondary system can be reduced, and on the other hand, the interferences caused by the existing second level secondary systems to primary system can be reduced so that the amount of frequency spectral resources allowed to be allocated to the target secondary system can be increased accordingly.

Further, if the pre-estimated interferences to the existing first level secondary systems exceed the interference thresholds in the case that the target secondary system performs communication using the pre-estimated available frequency spectral, it is necessary to reduce the pre-estimated available frequency spectral for the target secondary system, so that the target secondary system may not reach the expected communication quality. In such a situation, the frequency spectral used by the existing second level secondary systems can also be reduced.

Various manners can be adopted to adjust the frequency spectral used by the existing second level secondary systems. One optional way is to reduce the frequency spectral used by all of the existing second level secondary systems, but the system overhead is high.

Therefore, one better way is to selectively adjust the existing second level secondary systems. According to an embodiment of the present application, the adjusting module 3003 is configured to select a second level secondary system to be adjusted according to the following principle: compared with reducing the frequency spectral used by the other second level secondary systems among the existing second level secondary systems, the available frequency spectral for the target secondary system can be increased more by reducing the frequency spectral used by this second level secondary system.

Wherein, the adjusting module 3003 can be configured to reduce the frequency spectral used by the selected one or more second level secondary systems to be adjusted by a fixed amount, or stop the one or more second level secondary systems.

More particularly, the adjusting module 3003 can be configured to select a second level secondary system to be adjusted according to a path loss or a distance from the existing second level secondary system to a primary system reference point and a path loss or a distance from the existing second level secondary system to the target secondary system.

Figure 4:
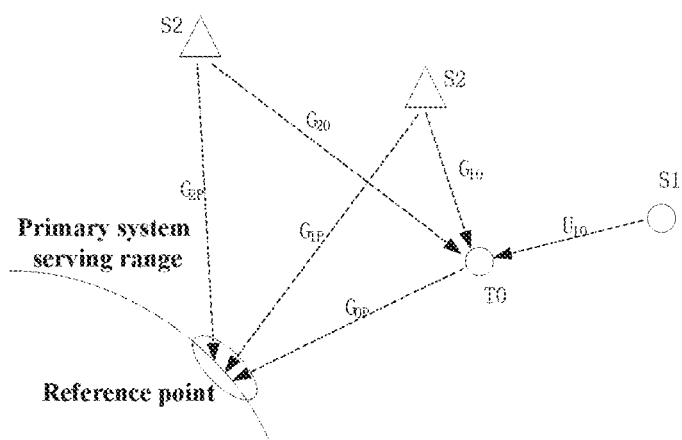
FIG. 4 is a schematic drawing illustrating how to select an existing second level secondary system to be adjusted.

FIG. 4 shows a schematic drawing illustrating how to select an existing second level secondary system to be adjusted. In FIG. 4, S2 denotes the existing second level secondary systems, S1 denotes the existing first level secondary systems and T0 denotes the target secondary system, which is a first level secondary system in this example. The reference point is a position in the service range of the primary system where the interferences caused by the target secondary system are most serious. Although only two second level secondary systems and one first level secondary system (the target secondary system not included) are shown in FIG. 4, it is only for the purpose of clarity of illustration and explanation. More generally, assuming there are totally N second level secondary systems and M first level secondary systems, the signal to noise ratio (SNR) of the target secondary system can be expressed as follows:

$$SNR = \frac{P_0}{\sum_{m=1}^{M} U_{m0}P_m + \sum_{n=1}^{N} G_{n0}P'_n + \sigma_n^2} \quad (1)$$

Wherein, $P_o$ is the maximum allowable transmission power for the target secondary system (the maximum available frequency spectral resources corresponding to a certain bandwidth at a certain location and at a certain time instance), and for example, $P_o$ can be the frequency spectral acquired by the available frequency spectral acquiring unit 502. $P_m$ is the transmission power of an existing first level secondary system. $U_{m0}$ is the path loss from the m-th first level secondary system to the target secondary system. $P'_n$ is the transmission power of an existing second level secondary system. $G_{n0}$ is the path loss from the n-th second level secondary system to the target secondary system. $\sigma_n^2$ is the Gaussian white noise of the receiver of the target secondary system. In addition, FIG. 4 also shows the path loss from the target secondary system to the reference point of the primary system as $G_{0p}$, and the path loss from the n-th second level secondary system to the reference point of the primary system as $G_{np}$.

As can be seen from equation (1), reducing the transmission power $P'_n$ of the existing second level secondary system can directly reduce the second item in the denominator. Meanwhile, it can be seen from FIG. 4 that reducing the transmission power $P'_n$ of the existing second level secondary system can reduce the amount of interferences at the reference point of the primary system so that the primary system can tolerate the interference caused by the target secondary system at its reference point, that is, can increase the maximum allowable transmission power for the target secondary system indirectly. Assuming that the transmission power of the existing second level secondary system is reduced by $\Delta P'_n$, the increase in the allowable transmission power for the target secondary system is:

$$\Delta P'_0 = \frac{\Delta P'_n G_{np}}{G_{op}} \quad (2)$$

In conjunction with equation (1), it can be seen that when the adjustment is made to a second level secondary system with higher $$\frac{G_{np}}{G_{op}} + G_{n0},$$

the improvement in the signal to noise ratio SNR of the target secondary system is more effective. As an example, to decrease the complexity of adjusting, the second level secondary systems are ranked according to their values of $$\frac{G_{np}}{G_{op}} + G_{n0}$$

in an order of from big to small, and then adjusted sequentially. Since $G_{0p}$ only depends on the locations of the target secondary system and the corresponding reference point of the primary system, and do not vary with the selection of the second level secondary systems, therefore, a higher $$\frac{G_{np}}{G_{op}} + G_{n0}$$

is equivalent to a higher $G_{np}+G_{n0}$. In other words, a second level secondary system to be adjusted can be selected according to a path loss from the existing second level secondary system to a primary system reference point and a path loss from the existing second level secondary system to the target secondary system.

Further, since the path loss increases as the distance decreases, the maximizing of the $G_{np}+G_{n0}$ can be approximately equivalent to the minimizing of the sum of the distance from the existing second level secondary system to the target secondary system and the distance from the existing second level secondary system to a primary system reference point. In other words, a second level secondary system to be adjusted can be selected according to a distance from the existing second level secondary system to a primary system reference point and a distance from the existing second level secondary system to the target secondary system.

Figure 5:
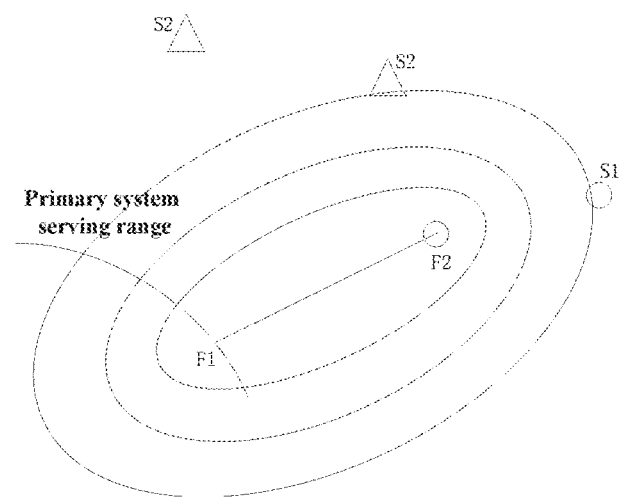
FIG. 5 is a schematic drawing illustrating the equivalent interference lines for selecting an existing second level secondary system to be adjusted.

Furthermore, the target secondary system and the primary system reference point thereof can be taken as two foci F2 and F1, and an ellipse is drawn by taking the sum of distances from any point in the plane to these two foci as a constant value. A series of ellipses can be drawn corresponding to different constant values, referred as equivalent interference lines, as shown in FIG. 5. That is, the effect of interferences on the same ellipse line is similar. In other words, the improvements to the SNR of the target secondary system by adjusting the frequency spectral usage of the second level secondary systems on the same ellipse line are similar. Wherein, the value of $$\frac{G_{np}}{G_{op}} + G_{n0}$$

is larger for the second level secondary system located in the inner circle than the second level secondary system located in the outer circle. Therefore, a second level secondary system to be adjusted can be selected relatively intuitively according to the correspondence between the geographical locations of the second level secondary systems and the ellipses.

Further, in other embodiments, the frequency spectral usage adjusting unit 503 can further include a priority level adjusting module, configured to change the priority level of the target secondary system to be the second level, in the case that there is no adjustable second level secondary system or the requirement for the communication quality can still not be satisfied by adjusting the existing second level secondary systems.

After determining the second level secondary systems to be adjusted, the frequency spectral management apparatus 105 can provide the adjusting information to the corresponding second level secondary systems via the communication unit 501. The corresponding second level secondary systems adjust the frequency spectral being used accordingly, such as reducing the frequency spectral by a fixed amount or stop using the frequency spectral. The adjustment to the existing second level secondary systems can be performed in real time.

In addition, it is generally required to set a period of validity for the frequency spectral used by the secondary systems according to the time when the primary system uses the frequency spectral. That is, the frequency spectral can be used within a certain time range. In this case, the adjusting module 3003 can be further configured to store correspondence between the target secondary system and the selected second level secondary systems to be adjusted in the case that it is necessary to adjust the frequency spectral used by the existing second level secondary systems, and after the target secondary system releases the frequency spectral, to restore the usage of the frequency spectral of the adjusted second level secondary systems, if the frequency spectral used by the adjusted second level secondary systems before adjusting is still in the period of validity thereof, and the restoration will not impact other first level secondary systems.

The structure and function for each component of the frequency spectral management apparatus 105 according to an embodiment of the present application has been described above. It can be seen, by using the frequency spectral usage adjusting unit 503 to determine the adjustment to the pre-estimated available frequency spectral for the target secondary system and/or the frequency spectral used by the existing second level secondary systems, the second level secondary systems can be efficiently controlled so that the first level secondary systems can effectively make use of the frequency spectral. Further, the second level secondary systems can acquire most frequency spectral resources without affecting the communication of the first level secondary systems.

Figure 6:
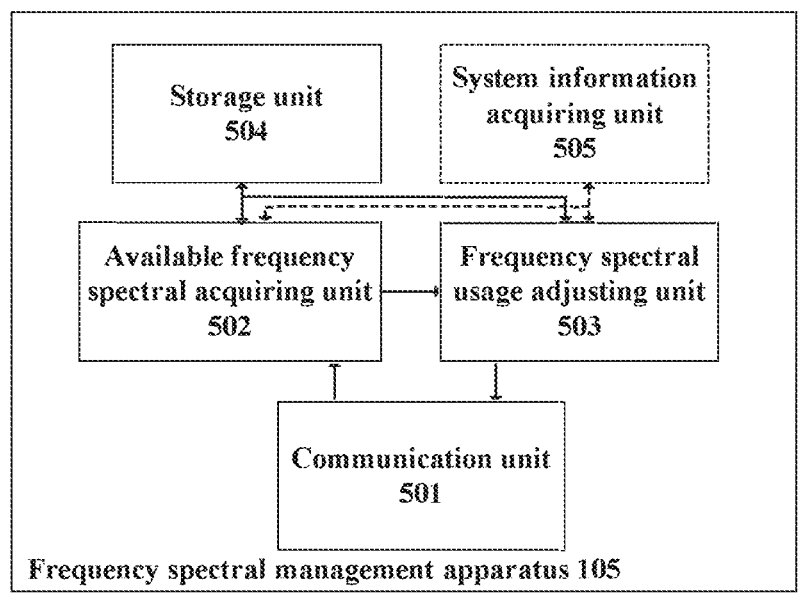
FIG. 6 shows the structural block diagram of the frequency spectral management apparatus in the cognitive radio system according to another embodiment of the invention.

Although FIG. 2 shown an exemplary structure of the frequency spectral management apparatus 105, it is not limited thereto. The frequency spectral management apparatus 105 can further other unit or combination of units. As shown in FIG. 6, the frequency spectral management apparatus 105 can further include a storage unit 504, configured to store information related to at least one of the primary system, the first level secondary system and the second level secondary system, wherein, the related information includes geographical location of each system, frequency spectral used by each system and the priority level of each system. In addition, the related information can further include the quality requirement to the frequency spectral usage of respective system and the interference threshold of respective system, etc, for example especially for the first level secondary system with QoS guarantee. The communication unit 501, the available frequency spectral acquiring unit 502 and the frequency spectral usage adjusting unit 503 are the same as those in FIG. 2 in structure and function, and the description thereof is omitted here.

The related information in the storage unit 504 can be used by the available frequency spectral acquiring unit 502 and/or the frequency spectral usage adjusting unit 503 for calculation. Specifically, for example, when the available frequency spectral acquiring unit 502 is configured to calculate the pre-estimated available frequency spectral by itself, it is possible to access this storage unit 504 to acquire the required parameters such as the interference threshold for the primary system, the frequency spectral used by the existing secondary systems and the geographical locations of the existing secondary systems, etc.

Likewise, the frequency spectral usage adjusting unit 503 can use the location of the existing secondary systems, the frequency spectral used by the existing secondary systems and the priority levels thereof stored in the storage unit 504, to calculate the amount of interferences to be produced to the existing first level secondary systems and the amount of interferences to be produced by the existing secondary systems to the target secondary system which is a first level secondary system when the target secondary system performs communication using the pre-estimated available frequency spectral.

In one implementation, the storage unit 504 can further perform the function of checking whether the target secondary system sending out the request is a valid secondary system, for example, of checking whether the target secondary system has passed some authentication.

Alternatively or additionally, as shown in FIG. 6 with dotted lines, the frequency spectral management apparatus 105 can further include a system information acquiring unit 505, configured to acquire information related to at least one of the primary system, the first level secondary system and the second level secondary system from outside, wherein, the related information includes geographical location of each system, frequency spectral used by each system and the priority level of each system.

The wording outside herein means any component or system external to the frequency spectral management apparatus 105. As an example, the system information acquiring unit 505 can be further configured to acquire information related to at least one of the primary system, the first level secondary system and the second level secondary system from a geographical location database.

In such a situation, the communication unit 501 is further configured to acquire the pre-estimated available frequency spectral from the geographical location database by providing the related information of the target secondary system to the geographical location database.

In addition, although it is stated in the above that the related information includes geographical location of each system, frequency spectral used by each system and the priority level of each system, the specific content of the related information is not limited thereto. For example, the related information can further include system parameters and the interference threshold of each system, etc.

The frequency spectral management apparatus 105 described above can be a separate apparatus, or for example can be located in the base station. Further, although FIG. 1 shows that the cognitive radio system 100 only includes one frequency spectral management apparatus 105, this is just an example, and those skilled in the art can understand that, the cognitive radio system 100 can include a plurality of frequency spectral management apparatus 105, which can operate by coordinating with exiting various methods.

Geographical Location Database

Figure 7:
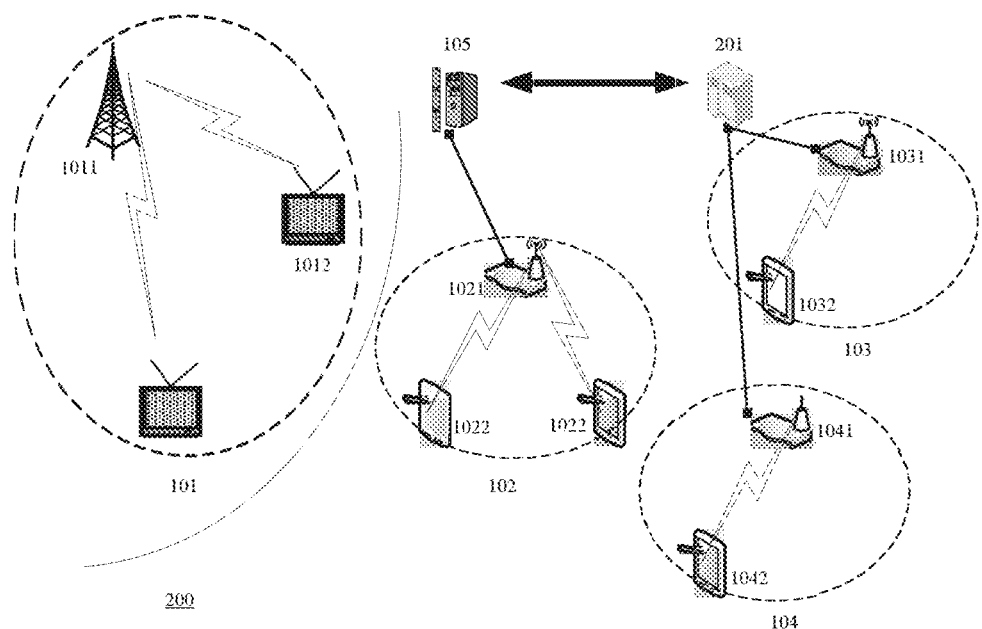
FIG. 7 is a schematic drawing illustrating the constitution of a cognitive radio system according to another embodiment of the invention.

According to another embodiment of the present invention, besides the frequency spectral management apparatus, the cognitive radio system can further include a geographical location database, as shown in FIG. 7.

In FIG. 7, the cognitive radio system 200 includes a primary system 101, a first level secondary system (for example, secondary system 102), and a second level secondary system (for example, secondary system 103, 104), the first level secondary system making use of frequency spectral resources for the primary system with a higher priority level than the second level secondary system. The cognitive radio system 200 includes a frequency spectral management apparatus 105 and a geographical location database 201. Similarly, the number of the frequency spectral management apparatus 105 and the geographical location database 201 is not limited to one.

Figure 8:
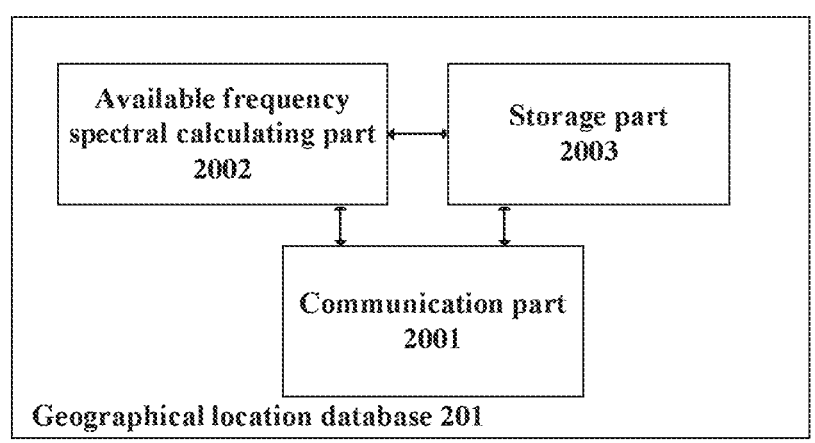
FIG. 8 shows the structural block diagram of the geographical location database in the cognitive radio system according to an embodiment of the invention.

Wherein, the frequency spectral management apparatus 105 has the structure and function described above with reference to FIG. 2, and the related description will not be repeated herein. As shown in FIG. 8, the geographical location database 201 includes: a communication part 2001, configured to receive information of a target secondary system requesting usage of the frequency spectral resources for the primary system; an available frequency spectral calculating part 2002, configured to calculate pre-estimated available frequency spectral for the target secondary system in response to the information; and a storage part 2003, configured to store information related to the primary system, the first level secondary system and the second level secondary system, wherein, the communication part 2001 transmits at least the pre-estimated available frequency spectral to a frequency spectral management apparatus 105 in the cognitive radio system 200, and receives information related to adjustment with respect to the pre-estimated available frequency spectral for the target secondary system and/or information related to adjustment with respect to the frequency spectral used by the existing second level secondary systems determined by the frequency spectral management apparatus 105 according to a priority level of the target secondary system.

Optionally, the communication part 2001 can further send the related information of the target secondary system and the related information of respective system stored in the storage part 2003 to the frequency spectral management apparatus.

As an example, the geographical location database 201 can directly feed the adjusting result, i.e., the available frequency spectral resources back to the target secondary system. Alternatively, the adjusting result is fed back to the target secondary system by the frequency spectral management apparatus 105, and the geographical location database 201 just use the storage part 2003 to record the situation of the frequency spectral allocation.

Wherein, the information related to the determined adjustment with respect to the frequency spectral used by the existing second level secondary systems can be a frequency spectral usage adjusting command containing the determined adjustment with respect to the frequency spectral used by the existing second level secondary systems. Moreover, although not shown in FIG. 8, the geographical location database 201 can further include a frequency spectral usage adjusting unit, configured to adjust the frequency spectral usage of the corresponding existing second level secondary systems according to the frequency spectral usage adjusting command.

In addition, the geographical location database 201 can further include: a period of validity setting part, configured to set a period of validity for the pre-estimated available frequency spectral resources for each second level secondary system according to the demand for frequency spectral of the primary system, and divide the period of validity into a plurality of valid time sections; and a timer, configured to perform timing so that the geographical location database determines the available frequency spectral resources for each second level secondary system at the time each valid time section expires, and performs adjusting to the frequency spectral used by the corresponding second level secondary systems based on the information related to the adjustment.

As described above, the pre-estimated frequency spectral resources are calculated under the condition that the interference the primary system is subjected to is expected not to exceed an interference threshold for the primary system. Taking the time when the primary system uses the frequency spectral into account, the period of validity setting part can set a period of validity for the calculated pre-estimated available frequency spectral resources, to ensure the protection to the primary system. Meanwhile, to achieve more accurate management temporally, the period of validity can be further divided into valid time sections, and the timer can start related processing at the time each valid time section ends so that the geographical location database is capable of determine for example the frequency spectral resources used by the respective second level secondary system can still be used, at which time it is also possible to perform adjustment with respect to the frequency spectral used by the existing second level secondary systems based on the received adjusting information.

An example of the information flow among the geographical location database 201, the frequency spectral management apparatus 105 and the target secondary system when the target secondary system T0 which is a second level secondary system requests the geographical location database 201 for using the frequency spectral resources for the primary system in the cognitive radio system 200 will be described below with reference to FIG. 9.

Figure 9:
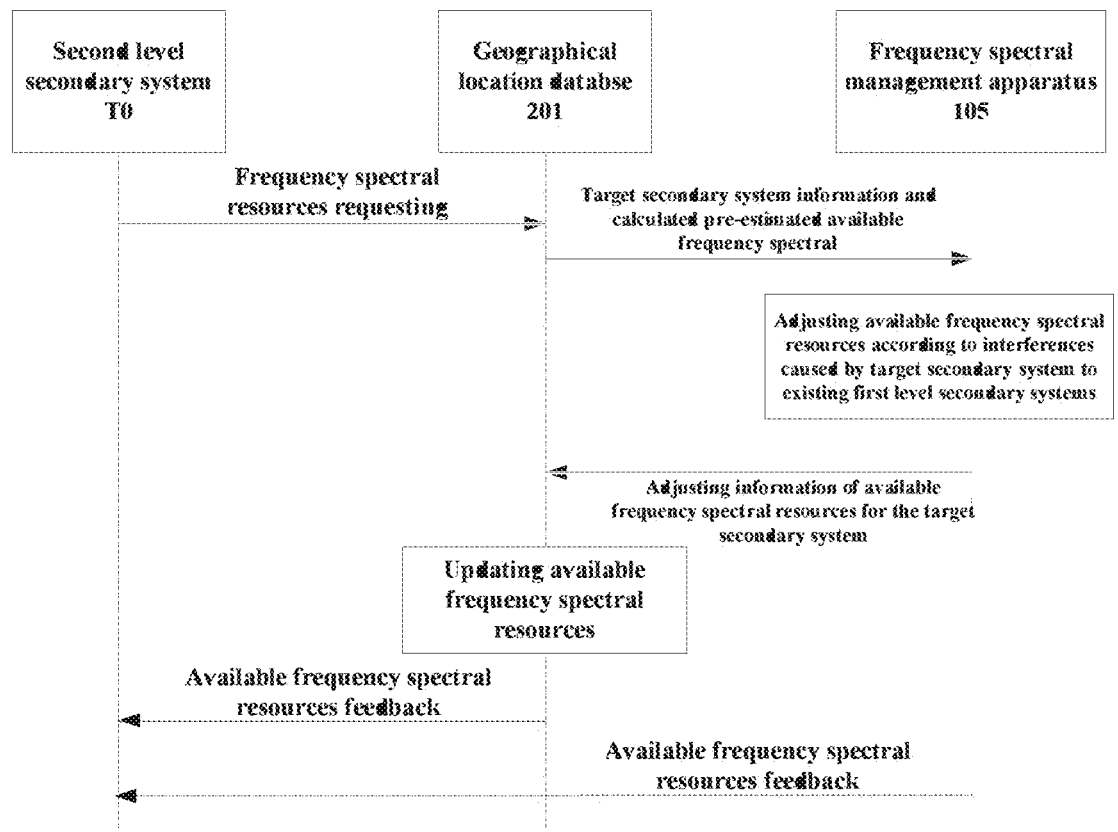
FIG. 9 shows the information flow in the cognitive radio system when the target secondary system is a second level secondary system.

As shown in FIG. 9, the second level secondary system T0 sends a request for using the frequency spectral resources to the geographical location database 201. The geographical location database 201 calculates the pre-estimated available frequency spectral for the secondary system T0, and transmits the result of calculation and the related information of the second level secondary system T0 to the frequency spectral management apparatus 105. The frequency spectral management apparatus 105 first determines its priority level to be the second level, and thus calculates the pre-estimated interferences the existing first level secondary system to be subjected to when the system T0 uses the pre-estimated available frequency spectral, so as to determine whether to adjust or reduce the pre-estimated available frequency spectral so that the pre-estimated interferences do not exceed the interference thresholds for the existing first level secondary systems. Then, the frequency spectral management apparatus 105 delivers the adjusting information to the geographical location database 201, which updates the pre-estimated available frequency spectral for the target secondary system according to the adjusting information, and feeds the information back to the target secondary system T0 via the communication part 2001. Of course, as another example, the adjusting information can also be fed back to the second level secondary system T0 directly by the frequency spectral management apparatus 105, as shown by the dotted lines.

Figure 10:
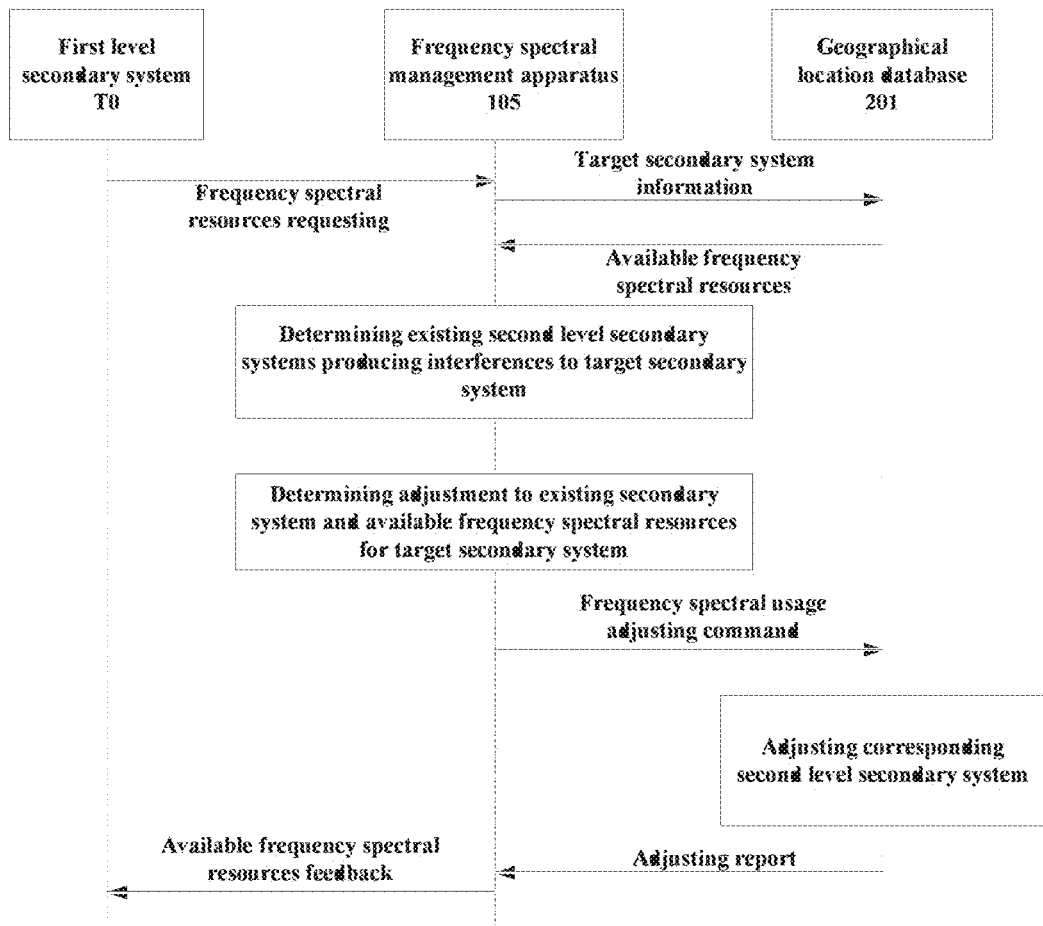
FIG. 10 shows the information flow in the cognitive radio system when the target secondary system is a first level secondary system.

In addition, FIG. 10 shows an example of the information flow among the geographical location database 201, the frequency spectral management apparatus 105 and the target secondary system when the target secondary system T0 which is a first level secondary system requests the frequency spectral management apparatus 105 for using the frequency spectral resources for the primary system.

As shown in FIG. 10, the first level secondary system T0 sends out a request for using the frequency spectral resources to the frequency spectral management apparatus 105. The frequency spectral management apparatus 105 acquires the desired communication quality and frequency spectral using conditions (for example, the application range) by the first level secondary system T0, and the interference threshold, etc, and transmits the related information of the first level secondary system T0 to the geographical location database 201. The geographical location database 201 calculates the frequency spectral resources for the primary system available to the target secondary system under the condition that the protection for the primary system is ensured, according to the geographical location information and the like of the target secondary system, and then transmits this information to the frequency spectral management apparatus 105. The frequency spectral management apparatus 105 judges which of the existing second level secondary systems may cause interferences to the target secondary system T0 (For example, the geographical location database 201 has transmitted the information of the existing second level secondary systems to the frequency spectral management apparatus in advance, such as at the time of determining the frequency spectral resources used by each of the second level secondary systems), according to the pre-estimated frequency spectral usage situation of the target secondary system and the interference threshold thereof, and determines adjustment to the frequency usage of the existing secondary systems and the target secondary system (the related method will be described in the following). The frequency spectral management apparatus 105 for example can adopt the adjusting method described previously to select a second level secondary system to be adjusted, so that the geographical location database 201 adjusts the corresponding second level secondary systems and transmits the adjusting report back to the frequency spectral management apparatus 105. At this time, the frequency spectral management apparatus 105 can feed the available frequency spectral resources back to the target secondary system T0.

Although the example of information flow for the target secondary system requesting the frequency spectral management apparatus 105 and the geographical location database 201 for using the frequency spectral resources for the primary system in the cognitive radio system has been described with reference to FIG. 9 and FIG. 10 in the above, the specific details are not limited thereto, and can be changed according to the structures and functions of the two correspondingly.

Secondary System Apparatus

The structure and function of the apparatus playing the role of frequency spectral management have been described above. It can be understood that the secondary system is necessary to include components capable of initiating a request and receiving the adjusting information.

Figure 11:
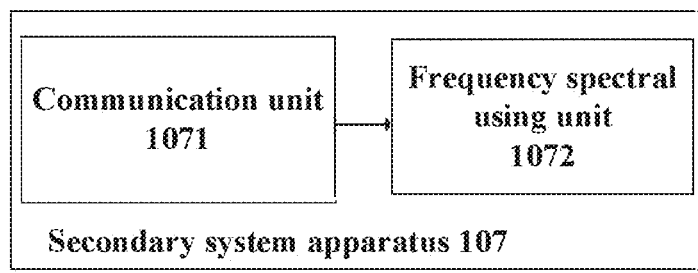
FIG. 11 shows the structural block diagram of the secondary system apparatus in the cognitive radio system according to an embodiment of the invention.

Therefore, according to an embodiment of the application, there is further provided a secondary system apparatus 107 in a cognitive radio system, as described above, the cognitive radio system comprises a primary system, a first level secondary system, and a second level secondary system, the first level secondary system making use of frequency spectral resources for the primary system with a higher priority level than the second level secondary system, and the secondary system apparatus 107 is provided in the first level secondary system or in the second level secondary system. As shown in FIG. 11, the secondary system apparatus 107 includes: a communication unit 1071, configured to transmit requesting information of requesting usage of the frequency spectral resources for the primary system, the requesting information containing information about a priority level of the secondary system apparatus, and receive available frequency spectral information for the secondary system apparatus determined according to the priority level; and a frequency spectral using unit 1072, configured to make use of the frequency spectral resources for the primary system according to the available frequency spectral information received by the communication unit 1071.

Wherein, the information about a priority level of the secondary system apparatus contains the information about the priority level of the secondary system, that is, the information regarding whether the secondary system is a first level secondary system or a second level secondary system.

When the secondary system apparatus 107 is corresponding to a second level secondary system, the communication unit 1071 is further configured to receive frequency spectral usage adjusting information regarding the secondary system apparatus 107, the frequency spectral usage adjusting information being determined according to the requesting information of the first level secondary system in the cognitive radio system requesting the usage of the frequency spectral resources for the primary system. For example, there is the following case: when a new first level secondary system requests to use the frequency spectral resources, the frequency spectral management apparatus 105 may reduce the frequency spectral used by the second level secondary system corresponding to the secondary system apparatus 107 in response to the request, and thus transmit an instruction for adjusting the frequency spectral usage to the communication unit 1071 of the secondary system apparatus 107.

Frequency Spectral Management System

According to the above disclosure of the present application, there is further provided a frequency spectral management system for managing frequency spectral usage in a cognitive radio system, wherein, the cognitive radio system comprises a primary system, a first level secondary system, and a second level secondary system, the first level secondary system making use of frequency spectral resources for the primary system with a higher priority level than the second level secondary system. The frequency spectral management system includes the frequency spectral management apparatus 105, the geographical location database 201 and the secondary system apparatus 107 as described above. Wherein, the communication part 2001 in the geographical location database 201 transmits at least the pre-estimated available frequency spectral to the frequency spectral management apparatus 105, and receives information related to adjustment with respect to the pre-estimated available frequency spectral for the target secondary system and/or information related to adjustment with respect to the frequency spectral used by the existing second level secondary systems determined by the frequency spectral management apparatus 105 according to the priority level of the target secondary system. The specific information flow has been described above in detail with reference to FIG. 9 and FIG. 10, and will be omitted here.

By using this frequency spectral management system, the frequency spectral resources for the primary system can be allocated more reasonably and the frequency spectral usage of the secondary system with a high priority level can be guaranteed first.

Frequency Spectral Management Method

It is apparent that some processing or methods are also disclosed in the description above on the frequency spectral management apparatus, the geographical location database and the secondary system apparatus according to embodiments of the present invention. Below, the summary of the methods is described without repeating the details which are already discussed above, however, it should be noted that although disclosed in the description of the frequency spectral management apparatus, the geographical location database and the secondary system apparatus, the methods do not certainly employ or are not certainly executed by the aforementioned components. For instance, embodiments of the frequency spectral management apparatus, the geographical location database and the secondary system apparatus may be partially or completely achieved by hardware and/or firmware, and the frequency spectral management methods described below may be fully achieved by a computer-executable program, although the frequency spectral management methods may employ the hardware and/or firmware of the frequency spectral management apparatus, the geographical location database and the secondary system apparatus.

Figure 12:
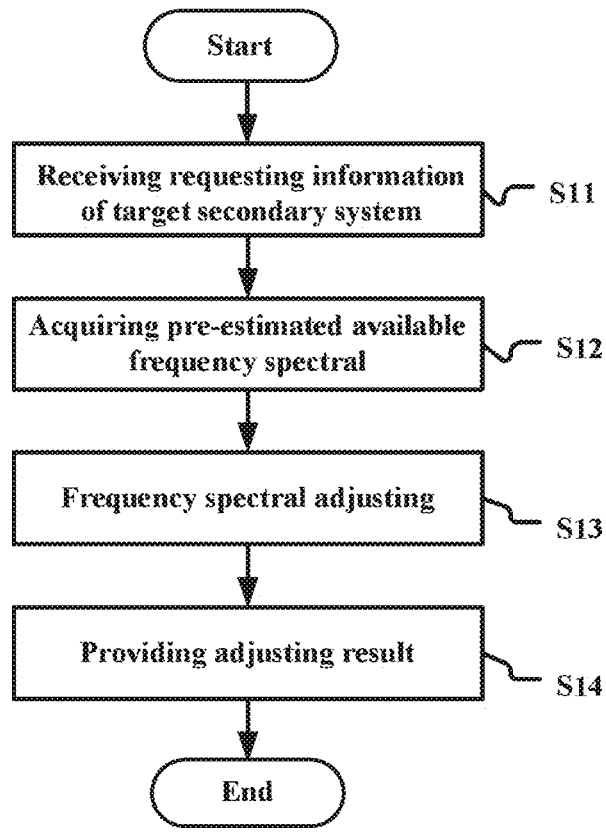
FIG. 12 shows the flowchart of the frequency spectral management method in the cognitive radio system according to an embodiment of the invention.

FIG. 12 shows the flowchart of the frequency spectral management method in the cognitive radio system according to an embodiment of the invention. Wherein, the cognitive radio system comprises a primary system, a first level secondary system, and a second level secondary system, the first level secondary system making use of frequency spectral resources for the primary system with a higher priority level than the second level secondary system. As shown in FIG. 12, the frequency spectral management method includes: receiving information of a target secondary system requesting usage of the frequency spectral resources for the primary system (S11); acquiring pre-estimated available frequency spectral for the target secondary system (S12); and determining adjustment with respect to the pre-estimated available frequency spectral for the target secondary system so as to determine available frequency spectral for the target secondary system, and/or determining adjustment with respect to the frequency spectral used by existing second level secondary systems, according to the priority level of the target secondary system (S13), and providing the adjustment information to the corresponding secondary systems (S14).

Wherein, the requesting information can contain the related information to the target secondary system, such as the priority level or ID of the corresponding secondary system. If necessary, the related information can further include parameters such as the geographical location of the system.

When the target secondary system expects to make use of the frequency spectral for the primary system, it sends the above requesting information. The pre-estimated available frequency spectral that can be provided to the target secondary system is acquired in response to the requesting information. Such acquiring can be calculating directly, or can be simply acquiring from a specialized storage apparatus or computing apparatus. In the case of calculating directly, the frequency spectral management method further includes a step of acquiring information related to at least one of the primary system, the first level secondary system and the second level secondary system. The related information includes geographical location of each system, frequency spectral used by each system and the priority level of each system. As an example, this related information can be acquired from a geographical location database. In addition, the pre-estimated available frequency spectral for the target secondary system can also be acquired directly from the geographical location database.

In one embodiment, the step of acquiring the pre-estimated available frequency spectral includes acquiring the pre-estimated available frequency spectral under the condition that interference the primary system is subjected to is expected not to exceed an interference threshold for the primary system when the target secondary system makes use of the frequency spectral resources for the primary system. The pre-estimated available frequency spectral can be acquired with any existing technique.

However, the pre-estimated available frequency spectral might not be totally allocated to the target secondary system for use, which depends on the one hand the priority level of the target secondary system, and on the other hand, the situation of the frequency spectral usage of the existing first level secondary systems. Therefore, to allocate the frequency spectral resources reasonably, it is necessary to implement the step S13 of frequency spectral adjusting.

Figure 13:
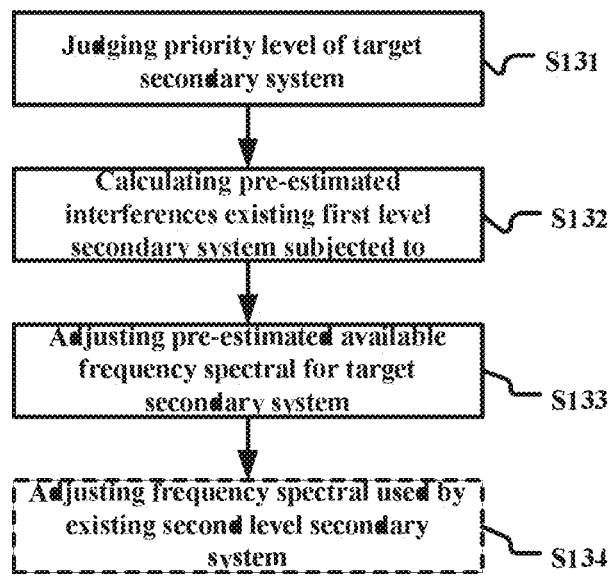
FIG. 13 shows the flowchart of the sub-steps of the frequency spectral adjusting step in the frequency spectral management method according to an embodiment of the invention.

Exemplarily, as shown by the solid lines in FIG. 13, the step S13 can include the following sub-steps: judging the priority level of the target secondary system (S131); calculating pre-estimated interferences existing first level secondary systems are subjected to when the target secondary system makes use of the frequency spectral resources for the primary system in accordance with the pre-estimated available frequency spectral therefor (S132); and determining adjustment with respect to the pre-estimated available frequency spectral for the target secondary system so as to determine the available frequency spectral therefor (S133).

Specifically, when the calculated pre-estimated interferences in the step S132 exceed the interference thresholds for the existing first level secondary system, frequency spectral less than the pre-estimated available frequency spectral is determined as the available frequency spectral for the target secondary system.

When the priority level of the target secondary system is judged to be second level, since its priority level is low, it is only required to reduce the pre-estimated available frequency spectral for the target secondary system, in the case that the communication quality of the existing first level secondary systems is necessary to be guaranteed.

When the priority level of the target secondary system is judged to be first level, the step S13 of adjusting further includes determining adjustment with respect to the frequency spectral used by the existing second level secondary systems on the basis of the requesting information of the target secondary system (S134). At this time, the flowchart of adjusting can be made reference to FIG. 14.

Specifically, in such a situation, since the priority level of the target secondary system is high, for example, its communication quality should be guaranteed. Therefore, the interferences caused by respective existing secondary system to the target secondary system are calculated first (S301), to judge whether the target secondary system can reach the expected communication quality (S302). If the judging result is NO, it is checked whether there is adjustable existing second level secondary system(s) (S303). If YES, an existing second level secondary system to be adjusted is selected (S304), and then the interferences the target secondary system to be subjected to are recalculated assuming the frequency spectral used by this existing second level secondary system is adjusted, until the target secondary system reaches the expected communication quality or there is no adjustable second level secondary system.

Then, in step S305, it is judged whether the interferences the existing first level secondary systems are subjected to exceed a predetermined threshold when the target secondary system performs communication using the currently calculated available frequency spectral. If NO, the processing proceeds to S 308 and the adjusting is ended. The target secondary system successfully requests the frequency spectral resources.

Otherwise, it is determined whether the current available frequency spectral for the target secondary system is zero (S306). If it is not zero, this available frequency spectral is reduced (S307) and the processing proceeds to step S302. That is, it is determined whether the target secondary system can reach the expected communication quality in the case of reducing the available frequency spectral resources. Again, if it can not reach the expected communication quality, the processing proceeds to step S303, S304 to further select an existing second level secondary system for adjusting.

On the other hand, if it is determined that the available frequency spectral for the target secondary system is zero, indicating there is no frequency spectral resources that can be allocated to the target secondary system, processing proceeds to step S309, and the flow ends. The target secondary system fails to request the frequency spectral resources.

Likewise, if no adjustable existing second level secondary system is found in step S303, indicating that the target secondary system can not operate normally in the case of not affecting the communication quality of the existing first level secondary systems, processing proceeds to step S309, and the target secondary system fails to request the frequency spectral resources.

Figure 14:
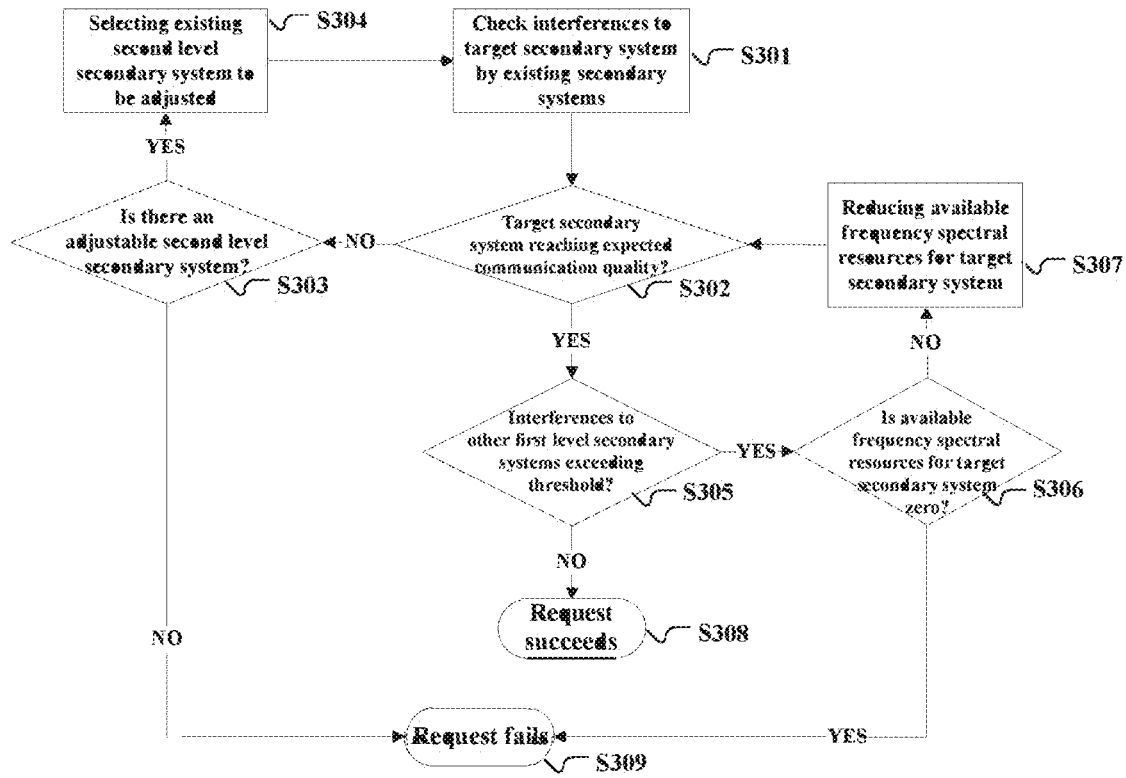
FIG. 14 is a detailed flowchart for the frequency adjusting performed when the target secondary system is a first level secondary system.

In addition, although not shown in FIG. 14, it should be understood that, a priority level adjusting step of changing the priority level of the target secondary system to be the second level can be further included, in the case that there is no adjustable second level secondary systems and thus the target secondary system fails to request the frequency spectral resources.

Wherein, in the step S304 of selecting a second level secondary system to be adjusted in FIG. 14, a second level secondary system to be adjusted is selected according to the following principle: compared with reducing the frequency spectral used by the other second level secondary systems among the existing second level secondary systems, the available frequency spectral for the target secondary system can be increased more by reducing the frequency spectral used by this second level secondary system. Specifically, a second level secondary system to be adjusted can be selected according to a path loss or a distance from the existing second level secondary system to a primary system reference point and a path loss or a distance from the existing second level secondary system to the target secondary system.

After selecting a second level secondary system to be adjusted, the frequency spectral used by the selected one or more second level secondary systems to be adjusted can be reduced by a fixed amount, or the selected one or more second level secondary systems to be adjusted can be stopped. Wherein, the adjusting can be implemented in real time.

As an example, in the above described cognitive radio system, the primary system can be the television broadcast system. Further, the first level secondary system can be a mobile communication system with Quality of Service guarantee.

The basic principle of the present invention has been described above in conjunction with particular embodiments. However, as can be appreciated by those ordinarily skilled in the art, all or any of the steps or components of the method and apparatus according to the invention can be implemented in hardware, firmware, software or a combination thereof in any computing device (including a processor, a storage medium, etc.) or a network of computing devices by those ordinarily skilled in the art in light of the disclosure of the invention and making use of their general programming skills.

Therefore, the present invention further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present invention. The memory medium includes but is not limited to soft disc, optical disc, magnetic optical disc, memory card, memory stick and the like.

In the case where the present application is realized by software or firmware, a program constituting the software is installed in a computer with a dedicated hardware structure (e.g. the general computer 1500 shown in FIG. 15) from a storage medium or network, wherein the computer is capable of implementing various functions when installed with various programs.

Figure 15:
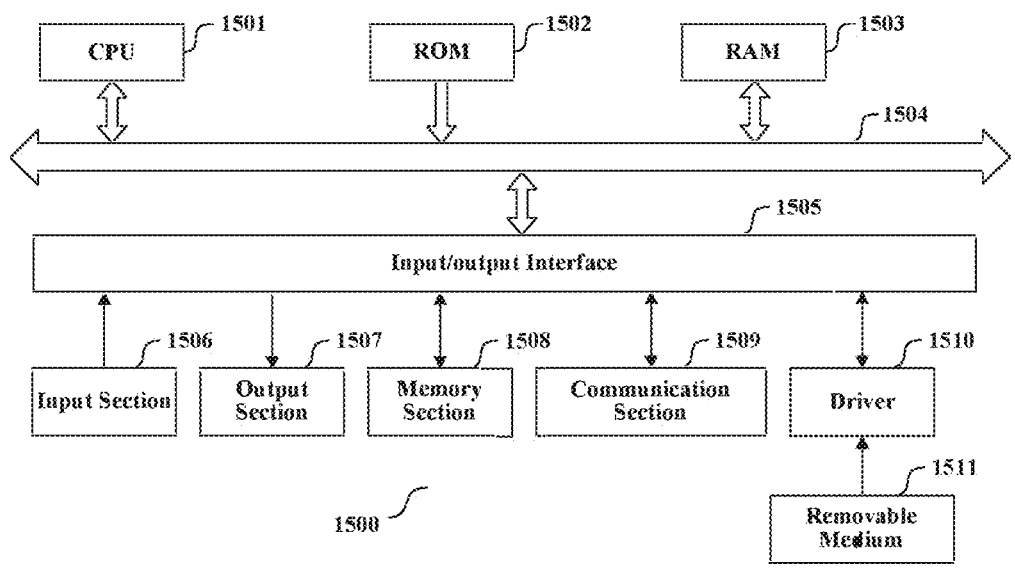
FIG. 15 is an exemplary block diagram illustrating the structure of a general purpose personal computer capable of realizing the method and/or apparatus and/or system according to the embodiments of the present invention.

In FIG. 15, a computing processing unit (CPU) 1501 executes various processing according to a program stored in a read-only memory (ROM) 1502 or a program loaded to a random access memory (RAM) 1503 from a storage section 1508. The data needed for the various processing of the CPU 1501 may be stored in the RAM 1503 as needed. The CPU 1501, the ROM 1502 and the RAM 1503 are linked with each other via a bus 1504. An input/output interface 1505 is also linked to the bus 1504.

The following components are linked to the input/output interface 1505: an input section 1506 (including keyboard, mouse and the like), an output section 1507 (including displays such as a cathode ray tube (CRT), a liquid crystal display (LCD), a loudspeaker and the like), a storage section 1508 (including hard disc and the like), and a communication section 1509 (including a network interface card such as a LAN card, modem and the like). The communication section 1509 performs communication processing via a network such as the Internet. A driver 1510 may also be linked to the input/output interface 1505, if needed. If needed, a removable medium 1511, for example, a magnetic disc, an optical disc, a magnetic optical disc, a semiconductor memory and the like, may be installed in the driver 1510, so that the computer program read therefrom is installed in the memory section 1508 as appropriate.

In the case where the foregoing series of processing is achieved through software, programs forming the software are installed from a network such as the Internet or a memory medium such as the removable medium 1511.

It should be appreciated by those skilled in the art that the memory medium is not limited to the removable medium 1511 shown in FIG. 15, which has program stored therein and is distributed separately from the apparatus so as to provide the programs to users. The removable medium 1511 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1502 and the storage section 1508 in which programs are stored, and can be distributed to users along with the device in which they are incorporated.

To be further noted, in the apparatus, method and system according to the invention, the respective components or steps can be decomposed and/or recombined. These decompositions and/or recombinations shall be regarded as equivalent solutions of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the invention have been described above in detail in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined merely by the appended claims and their equivalents.

The embodiments disclosed herein may be configured as below.

According to one exemplary embodiment, the disclosure is directed to a system comprising: circuitry configured to receive a request for resources from a first system of a plurality of systems having different levels of priority; identify resources that are available in a second system different from the plurality of systems based on the received request; and determine whether to adjust a resource assigned to the plurality of systems based on the priority level of the first system and the resources that are available in the second system.

According to the above system, the resources that are available in the second system are resources that are initially assigned for use by the second system and not initially assigned for use by the plurality of systems.

According to the above system, the second system is a television broadcast system operating in a ultra-high frequency (UHF) band, and the circuitry is configured to identify, as the resources that are available in the second system, at least at subset of the UHF band.

According to the above system, the circuitry is configured to identify the resources that are available in the second system by identifying resources assigned to the second system that could be used by the first system without causing interference in the second system above a predetermined threshold.

According to the above system, the circuitry is configured to: estimate a level of interference caused to the second system when the resources that are available in the second system are reassigned to the first system; and determine whether to adjust a resource assigned to the first system based on the estimated level of interference.

According to the above system, the circuitry is configured to: estimate a level of interference caused to a third system of the plurality of systems when the resources that are available in the second system are reassigned to the first system; and determine whether to adjust a resource assigned to the first system based on the estimated level of interference.

According to the above system, the request includes information indicating a geographic location of the first system, and the circuitry is configured to identify the resources that are available in the second system based on the geographic location of the first system.

According to the above system, the request includes information identifying the level of priority of the first system.

According to the above system, the plurality of systems includes the first system having a first level of priority for accessing resources of the second system and a third system having a second level of priority for accessing resources of the second system, the second level of priority being greater than the first level of priority.

According to the above system, the circuitry is configured to estimate a level of interference to the third system if the resources that are available in the second system were to be assigned to the first system.

According to the above system, the circuitry is configured to assign the resources that are available in the second system to the first system when estimated level of interference to the third system does not exceed a predetermined threshold value.

According to the above system, the circuitry is configured to control adjusting the resources that are available to the first system when the estimated level of interference to the third system exceeds a predetermined threshold value.

According to the above system, the plurality of systems includes the first system having a first level of priority for accessing resources of the second system and a third system having a second level of priority for accessing resources of the second system, the first level of priority being greater than the second level of priority.

According to the above system, the request for resources from the first system includes information indicating at least one of a desired communication quality, a desired communication range and a tolerable interference threshold in the first system, and the circuitry is configured to identify the resources that are available in a second system based on the information included in the received request.

According to the above system, the circuitry is configured to determine a level of interference to the first system by the third system if the resources that are available in the second system were to be assigned to the first system.

According to the above system, the circuitry is configured to assign the resources that are available in the second system to the first system and not control adjusting resources assigned to the third system when the determined level of interference to the first system by the third system does not exceed a predetermined threshold value.

According to the above system, the circuitry is configured to assign the resources that are available in the second system to the first system and control adjusting resources assigned to the third system to reduce interference to the first system when the determined level of interference to the first system by the third system exceeds a predetermined threshold value.

According to the above system, the plurality of systems includes the first system having a first level of priority for accessing resources of the second system, and third and fourth systems each having a level of priority for accessing resources of the second system that is less than the first level of priority; and the circuitry is configured to determine a level of interference to the first system if the resources that are available in the second system were to be assigned to the first system; assign the resources that are available in the second system to the first system and control adjusting resources assigned to at least one of the third and fourth systems determined to cause a higher amount of interference to the first system when the determined level of interference to the first system exceeds a predetermined threshold value.

According to the above system, the circuitry is configured to identify the resources that are available in the second system based on information identifying the resources received from a database remotely connected to the system.

According to another exemplary embodiment, the disclosure is directed to a non-transitory computer-readable medium including computer-readable instructions, which when executed by a system, cause the system to: receive a request for resources from a first system of a plurality of systems having different levels of priority; identify resources that are available in a second system different from the plurality of systems based on the received request; and determine whether to adjust a resource assigned to the plurality of systems based on the priority level of the first system and the resources that are available in the second system.

According to another exemplary embodiment, the disclosure is directed to a system comprising: circuitry configured to receive a request for resources from a first system of a plurality of systems having different levels of priority; transmit, to another system, information identifying resources that are available in a second system different from the plurality of systems based on the received request; and receive, from the another system, information requesting to adjust a resource assigned to the plurality of systems based on the priority level of the first system and the resources that are available in the second system.

According to another exemplary embodiment, the disclosure is directed to a frequency spectral management apparatus in a cognitive radio system, wherein, the cognitive radio system comprises a primary system, a first level secondary system, and a second level secondary system, the first level secondary system making use of frequency spectral resources for the primary system with a higher priority level than the second level secondary system, the frequency spectral management apparatus comprising: a communication unit, configured to receive information of a target secondary system requesting usage of the frequency spectral resources for the primary system; an available frequency spectral acquiring unit, configured to acquire pre-estimated available frequency spectral for the target secondary system; and a frequency spectral usage adjusting unit, configured to determine adjustment with respect to the pre-estimated available frequency spectral for the target secondary system so as to determine available frequency spectral for the target secondary system, and/or determine adjustment with respect to the frequency spectral used by existing second level secondary systems, according to the priority level of the target secondary system.

The above apparatus, further comprising a storage unit, configured to store information related to at least one of the primary system, the first level secondary system and the second level secondary system, wherein, the related information comprises geographical location of each system, frequency spectral used by each system and the priority level of each system.

The above apparatus, further comprising a system information acquiring unit, configured to acquire information related to at least one of the primary system, the first level secondary system and the second level secondary system from outside, wherein, the related information comprises geographical location of each system, frequency spectral used by each system and the priority level of each system.

According to the above apparatus, the related information regarding the target secondary system is contained in information of the target secondary system requesting the usage of the frequency spectral resources for the primary system.

According to the above apparatus, the available frequency spectral acquiring unit is configured to acquire the pre-estimated available frequency spectral under a condition that interference the primary system is subjected to is expected not to exceed an interference threshold for the primary system when the target secondary system makes use of the frequency spectral resources for the primary system.

According to the above apparatus, the frequency spectral usage adjusting unit comprises: a system priority level judging module, configured to judge the priority level of the target secondary system; an interference calculating module, configured to calculate pre-estimated interferences existing first level secondary systems are subjected to when the target secondary system makes use of the frequency spectral resources for the primary system in accordance with the pre-estimated available frequency spectral therefor; and an adjusting module, configured to determine adjustment with respect to the pre-estimated available frequency spectral for the target secondary system so as to determine the available frequency spectral therefor.

According to the above apparatus, the adjusting module determines frequency spectral less than the pre-estimated available frequency spectral as the available frequency spectral for the target secondary system, in the case that the pre-estimated interferences calculated by the interference calculating module exceed interference thresholds for the existing first level secondary systems.

According to the above apparatus, the adjusting module is further configured to determine adjustment with respect to the frequency spectral used by the existing second level secondary systems on the basis of the information of the target secondary system requesting the usage of the frequency spectral resources for the primary system, in the case that the system priority level judging module judges that the target secondary system is a first level secondary system.

According to the above apparatus, the adjusting module is configured to select a second level secondary system to be adjusted according to the following principle: compared with reducing the frequency spectral used by the other second level secondary systems among the existing second level secondary systems, the available frequency spectral for the target secondary system can be increased more by reducing the frequency spectral used by this second level secondary system.

According to the above apparatus, the adjusting module is configured to reduce the frequency spectral used by the selected one or more second level secondary systems to be adjusted by a fixed amount, or stop the one or more second level secondary systems.

According to the above apparatus, the adjusting module is configured to select a second level secondary system to be adjusted according to a path loss or a distance from the existing second level secondary system to a primary system reference point and a path loss or a distance from the existing second level secondary system to the target secondary system.

According to the above apparatus, the primary system is the television broadcast system.

According to the above apparatus, the frequency spectral usage adjusting unit is further configured to adjust the frequency spectral usage of the corresponding existing second level secondary systems according to the determined adjustment with respect to the frequency spectral used by the existing second level secondary systems.

According to another exemplary embodiment, the disclosure is directed to a geographical location database in a cognitive radio system, wherein, the cognitive radio system comprises a primary system, a first level secondary system, and a second level secondary system, the first level secondary system making use of frequency spectral resources for the primary system with a higher priority level than the second level secondary system, the geographical location database comprising: a communication part, configured to receive information of a target secondary system requesting usage of the frequency spectral resources for the primary system; an available frequency spectral calculating part, configured to calculate pre-estimated available frequency spectral for the target secondary system in response to the information; and a storage part, configured to store information related to the primary system, the first level secondary system and the second level secondary system, wherein, the communication part transmits at least the pre-estimated available frequency spectral to a frequency spectral management apparatus in the cognitive radio system, and receives information related to adjustment with respect to the pre-estimated available frequency spectral for the target secondary system and/or information related to adjustment with respect to the frequency spectral used by the existing second level secondary systems determined by the frequency spectral management apparatus according to a priority level of the target secondary system.

According to the above geographical location database, the information related to the determined adjustment with respect to the frequency spectral used by the existing second level secondary systems is a frequency spectral usage adjusting command containing the determined adjustment with respect to the frequency spectral used by the existing second level secondary systems, and the geographical location database further comprises a frequency spectral usage adjusting unit, which is configured to adjust the frequency spectral usage of the corresponding existing second level secondary systems according to the frequency spectral usage adjusting command.

The above geographical location database, further comprising: a period of validity setting part, configured to set a period of validity for the pre-estimated available frequency spectral resources for each second level secondary system according to the demand for frequency spectral of the primary system, and divide the period of validity into a plurality of valid time sections; and a timer, configured to perform timing so that the geographical location database determines the available frequency spectral resources for each second level secondary system at the time each valid time section expires, and performs adjusting to the frequency spectral used by the corresponding second level secondary systems based on the information related to the adjustment.

According to another exemplary embodiment, the disclosure is directed to a secondary system apparatus in a cognitive radio system, wherein, the cognitive radio system comprises a primary system, a first level secondary system, and a second level secondary system, the first level secondary system making use of frequency spectral resources for the primary system with a higher priority level than the second level secondary system, the secondary system apparatus is provided in the first level secondary system or in the second level secondary system, the secondary system apparatus comprising: a communication unit, configured to transmit requesting information of requesting usage of the frequency spectral resources for the primary system, the requesting information containing information about a priority level of the secondary system apparatus, and receive available frequency spectral information for the secondary system apparatus determined according to the priority level; and a frequency spectral using unit, configured to make use of the frequency spectral resources for the primary system according to the available frequency spectral information received by the communication unit.

According to the above secondary system apparatus, the communication unit is further configured to receive frequency spectral usage adjusting information regarding the secondary system apparatus when the secondary system apparatus is corresponding to a second level secondary system, the frequency spectral usage adjusting information being determined according to the requesting information of the first level secondary system in the cognitive radio system requesting the usage of the frequency spectral resources for the primary system.

According to another exemplary embodiment, the disclosure is directed to a frequency spectral management system for managing frequency spectral usage in a cognitive radio system, wherein, the cognitive radio system comprises a primary system, a first level secondary system, and a second level secondary system, the first level secondary system making use of frequency spectral resources for the primary system with a higher priority level than the second level secondary system, the frequency spectral management system comprising: a frequency spectral management apparatus, comprising: a communication unit, configured to receive information of a target secondary system requesting usage of the frequency spectral resources for the primary system; an available frequency spectral acquiring unit, configured to acquire pre-estimated available frequency spectral for the target secondary system; and a frequency spectral usage adjusting unit, configured to determine adjustment with respect to the pre-estimated available frequency spectral for the target secondary system so as to determine available frequency spectral for the target secondary system, and/or determine adjustment with respect to the frequency spectral used by existing second level secondary systems, according to the priority level of the target secondary system, a geographical location database, comprising: a communication part, configured to receive information of a target secondary system requesting the usage of the frequency spectral resources for the primary system; an available frequency spectral calculating part, configured to calculate pre-estimated available frequency spectral for the target secondary system in response to the information; and a storage part, configured to store information related to the primary system, the first level secondary system and the second level secondary system, and a secondary system apparatus, comprising: a communication unit, configured to transmit requesting information of requesting the usage of the frequency spectral resources for the primary system, the requesting information containing information about a priority level of the secondary system apparatus, and receive available frequency spectral information for the secondary system apparatus determined according to the priority level; and a frequency spectral using unit, configured to make use of the frequency spectral resources for the primary system according to the available frequency spectral information received by the communication unit, wherein, the communication part in the geographical location database transmits at least the pre-estimated available frequency spectral to the frequency spectral management apparatus, and receives information related to adjustment with respect to the pre-estimated available frequency spectral for the target secondary system and/or information related to adjustment with respect to the frequency spectral used by the existing second level secondary systems determined by the frequency spectral management apparatus according to the priority level of the target secondary system.

According to another exemplary embodiment, the disclosure is directed to a frequency spectral management method in a cognitive radio system, wherein, the cognitive radio system comprises a primary system, a first level secondary system, and a second level secondary system, the first level secondary system making use of frequency spectral resources for the primary system with a higher priority level than the second level secondary system, the frequency spectral management method comprising: receiving information of a target secondary system requesting usage of the frequency spectral resources for the primary system; acquiring pre-estimated available frequency spectral for the target secondary system; and determining adjustment with respect to the pre-estimated available frequency spectral for the target secondary system so as to determine available frequency spectral for the target secondary system, and/or determining adjustment with respect to the frequency spectral used by existing second level secondary systems, according to the priority level of the target secondary system, and providing the adjustment information to the corresponding secondary systems.

The above frequency spectral management method further comprising: acquiring information related to at least one of the primary system, the first level secondary system and the second level secondary system, wherein, the related information comprises geographical locations of each system, frequency spectral used by each system and priority levels of each system.

According to the above frequency spectral management method, the related information regarding the target secondary system being contained in information of the target secondary system requesting the usage of the frequency spectral resources for the primary system.

The above frequency spectral management method, the step of acquiring the pre-estimated available frequency spectral comprises acquiring the pre-estimated available frequency spectral under the condition that interference the primary system is subjected to is expected not to exceed an interference threshold for the primary system when the target secondary system makes use of the frequency spectral resources for the primary system.

The above frequency spectral management method, the step of adjusting comprising: judging the priority level of the target secondary system; calculating pre-estimated interferences existing first level secondary systems are subjected to when the target secondary system makes use of the frequency spectral resources for the primary system in accordance with the pre-estimated available frequency spectral therefor; and determining adjustment with respect to the pre-estimated available frequency spectral for the target secondary system so as to determine the available frequency spectral therefor.

According to the above frequency spectral management method, determining frequency spectral less than the pre-estimated available frequency spectral as the available frequency spectral for the target secondary system, in the case that the pre-estimated interferences exceed interference thresholds for the existing first level secondary systems.

The above frequency spectral management method, wherein determining adjustment with respect to the frequency spectral used by the existing second level secondary systems on the basis of the requesting information of the target secondary system, in the case that the target secondary system is judged to be a first level secondary system.

The invention claimed is:

1. A communication apparatus that coordinates operations of a plurality of secondary systems that use at least a portion of a frequency spectrum assigned to a primary system, the communication apparatus comprising circuitry configured to:
receive a request for resources from a first secondary system of the plurality of secondary systems that have differing levels of priority;
determine a priority level of the first secondary system based on the received request;
send a resource usage adjustment command to at least another of the plurality of secondary systems, under a condition the priority level of the first secondary system has a higher priority level than the at least another of the plurality of secondary systems; and
assign spectral resources to the first secondary system.

2. The communication apparatus of claim 1, wherein the circuitry is further configured to send the resource usage adjustment command under a condition the circuitry determines that an interference level imposed by the at least another of the plurality of secondary systems on the first secondary system exceeds a predetermined threshold.

3. The communication apparatus according to claim 2, wherein the circuitry is further configured to:
send another resource usage adjustment command under a condition the circuitry determines that an interference level imposed by a third of the plurality of secondary systems on the first secondary system exceeds another predetermined threshold.

4. The communication apparatus according to claim 2, wherein the circuitry is further configured to:
obtain a geographic location, the frequency spectrum, and a priority level of at least the first secondary system; and
assign at least a portion of the spectral resources to the at least another of the plurality of secondary systems based on the obtained geographic location, the frequency spectrum, and the priority level.

5. The communication apparatus according to claim 2, wherein:
the first secondary system is a quality of service (QoS) requirement mobile communication system, and
the another secondary system is a mobile communication system that uses spectrum resources without QoS requirements.

6. The communication apparatus according to claim 2, wherein the circuitry is configured to:
compare path loss values of the plurality of secondary systems to a reference point of the primary system, and
select at least one secondary system of the plurality of secondary systems to be adjusted based on said comparison.

7. The communication apparatus according to claim 2, wherein the circuitry is configured to:
compare path loss values of the another of the plurality of secondary systems to a reference point of the first secondary system, and
select a spectrum allocation of the another secondary system of the plurality of secondary systems to be adjusted based on said comparison.

8. The communication apparatus according to claim 2, wherein the circuitry is configured to:
compare a sum of distance weighted values from the plurality of secondary systems to a reference point of the primary system, and
select at least the another secondary system of the plurality of secondary systems to adjust spectrum allocation based on said comparison.

9. The communication apparatus according to claim 1, wherein the circuitry is further configured to:
assign a fractional portion of the frequency spectrum assigned to the primary system to the first secondary system.

10. The communication apparatus according to claim 9, wherein the circuitry is further configured to:
reduce the fractional portion of the frequency spectrum allocated to the first secondary system based on a predefined criteria.

11. The communication apparatus according to claim 1, wherein the circuitry is further configured to:
assign the spectral resources to the first secondary system under a condition an interference level predicted to be experienced by the primary system does not exceed a predetermined threshold.

12. The communication apparatus according to claim 11, wherein the circuitry is further configured to:
under a condition the interference level exceeds the predetermined threshold, reallocate at least a portion of the spectral resources from the first secondary system back to the primary system.

13. A non-transitory computer readable medium for a communication apparatus that coordinates operations of a plurality of secondary systems that use at least a portion of a frequency spectrum assigned to a primary system, the non-transitory computer readable medium including computer executable instructions that when executed by a processor cause the processor to:
receive a request for resources from a first secondary system of the plurality of secondary systems that have differing levels of priority;
determine a priority level of the first secondary system based on the received request;
send a resource usage adjustment command to at least another of the plurality of secondary systems, under a condition the priority level of the first secondary system has a higher priority level than the at least another of the plurality of secondary systems; and
assign resources to the first secondary system.

14. The computer readable medium according to claim 13, wherein the instructions are configured to cause the processor to:
send the resource usage adjustment command under a condition the circuitry determines that an interference level imposed by the at least another of the plurality of secondary systems on the first secondary system exceeds a predetermined threshold.

15. The computer readable medium according to claim 14, wherein the instructions are configured to cause the processor to:
send another resource usage adjustment command under a condition the circuitry determines that an interference level imposed by a third of the plurality of secondary systems on the first secondary system exceeds another predetermined threshold.

16. The computer readable medium according to claim 14, wherein the instructions are configured to cause the processor to:
obtain a geographic location, the frequency spectrum, and a priority level of at least the first secondary system; and
assign at least a portion of the spectral resources to the at least another of the plurality of secondary systems based on the obtained geographic location, the frequency spectrum, and the priority level.

17. The computer readable medium according to claim 13, wherein the instructions are configured to cause the processor to:
assign a fractional portion of the frequency spectrum assigned to the primary system to the first secondary system.

18. The computer readable medium according to claim 17, wherein the instructions are configured to cause the processor to:
reduce the fractional portion of the frequency spectrum allocated to the first secondary system based on a predefined criteria.

19. The computer readable medium according to claim 13, wherein the instructions are configured to cause the processor to:
assign the spectral resources to the first secondary system under a condition an interference level predicted to be experienced by the primary system does not exceed a predetermined threshold.

20. The computer readable medium according to claim 19, wherein the instructions are configured to cause the processor to:
under a condition the interference level exceeds the predetermined threshold, reallocate at least a portion of the spectral resources from the first secondary system to the primary system.

* * * * *